UNITED STATES PATENT OFFICE.

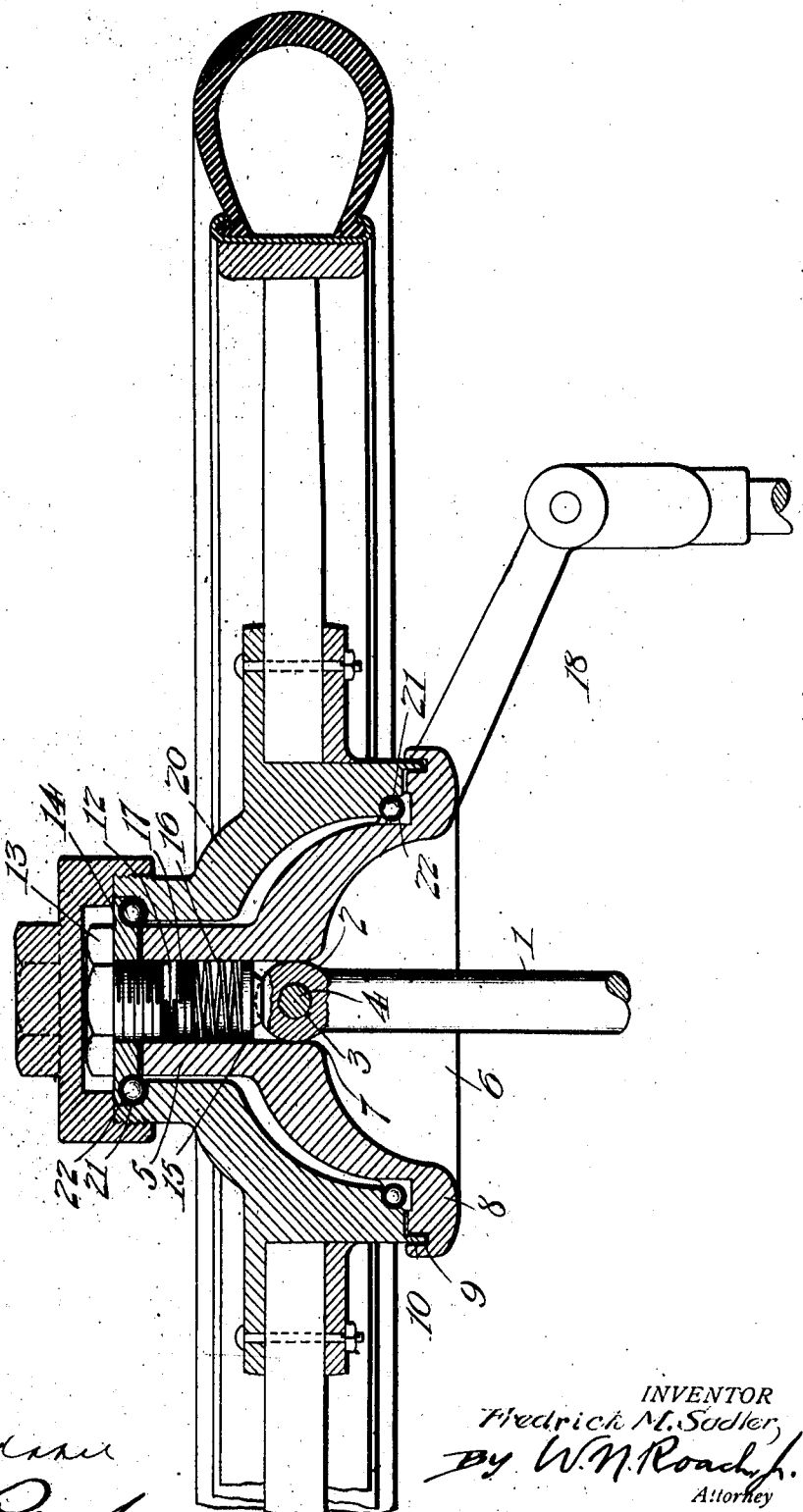

FREDRICK M. SADLER, OF ELLSWORTH, MINNESOTA.

STEERING MECHANISM.

1,048,890.   Specification of Letters Patent.   Patented Dec. 31, 1912.

Application filed December 18, 1911. Serial No. 666,386.

*To all whom it may concern:*

Be it known that I, FREDRICK M. SADLER, a citizen of the United States of America, residing at Ellsworth, in the county of Nobles and State of Minnesota, have invented certain new and useful Improvements in Steering Mechanism, of which the following is a specification.

This invention relates to steering-axles for motor driven vehicles and, more particularly, to that class of axles in which the wheels are individually pivoted to the axle members.

The object of my invention is to provide a simple and efficient structure in which the pivot point lies within the central plane of the wheel, thereby doing away with the tendency of the wheel to veer when an obstruction is met with.

A further object of my structure is to provide a dust proof and easy running connection between the wheel and its axle.

In the drawing, which represents a longitudinal sectional view of the invention, a main axle 1 terminates in a spherical head 2 provided with a recess 3 for the reception of the pivot pin or bolt 4 which holds the stub axle in place. A stub-axle 5 provided with a cup shaped recess 6, said recess terminating at its bottom in a hemispherical recess 7, for the reception of the spherical end of the axle, terminates at its inner portion in the outwardly flaring flange 8 provided with an annular recess 9 for the reception of projection or flange 10 of the hub. Said stub-axle is further provided with a suitable recess 11 for the reception of pivot pin 4 and, at its outer end, with the threaded recess 12 for the reception of the tap bolt 13 which holds in place the ball retaining washer 14.

As is suggested in the drawing the stub axle 5 may be centrally bored throughout its length and such bore threaded. The head 2 of axle 1 in this form of the invention has an end recess that is engaged by a projection on a washer 15. A spring 16 in the bore holds washer 15 in yielding engagement with axle head 2 and the tension of the spring may be regulated by the screw 17 that engages the threads of the stub axle bore. A tap bolt may be used to seal the outer end of the stub axle bore.

With the structure just described, it will be clear that the pressure of the washer 15 on the axle head 2 yieldably opposes pivotal movements of the stub axle, such opposition to the pivotal movements of said stub axle being sufficient to prevent accidental wabbling of the wheel such as would be incidental to wear of contacting parts, and the like.

The stub-axle is further provided with an arm 18 to which is pivoted the connecting rod between wheels, and with the arm 19 for connection with the steering rod. The wheel hub 20 has a cup shaped recess to accommodate the form of the stub axle and is provided with suitable ball-races 21 for the reception of the balls 22 and is sealed at its outer end by a cap nut 23.

It will be obvious, from the foregoing, that because of projection 10 running in groove 9 we have a practically dust proof bearing and, the pivot point lying in the central plane of the wheel, there is no sidewise thrust due to the wheel coming in contact with obstructions.

Having described my invention, what I claim as new and desire to secure by Letters Patent, is:—

1. A steering mechanism for vehicles comprising an axle terminating in a head, a stub axle having a center bore into which the head projects, means for pivotally connecting the head to the stub axle, a washer in the bore, and adjustable means for adjustably holding the washer in engagement with the head to oppose pivotal movements of the stub axle.

2. A steering mechanism for vehicles comprising a main axle, a stub axle having a bore into which the main axle projects, means for pivotally connecting the main axle to the stub axle, a washer in said bore and engaging the main axle to oppose pivotal movements of the stub axle relative to the main axle, and means for maintaining a yieldable pressure on said washer.

3. A steering mechanism for vehicles comprising a stub axle having a central bore, said bore being threaded, a main axle having an end head projecting into the bore, said head having an end recess, means for pivotally connecting the head to the stub axle, a washer in the bore and provided with a projection that enters the recess in the head, a spring in the bore for yieldably holding the washer in engagement with the head, a screw in the bore for regulating the tension of the spring, and a closure for the outer end of the bore.

In testimony whereof I hereunto affix my signature in presence of two witnesses.

FREDRICK M. SADLER.

Witnesses:
F. W. STANTON,
E. A. NELSON.

Copies of this patent may be obtained for five cents each, by addressing the "Commissioner of Patents, Washington, D. C."